No. 884,967. PATENTED APR. 14, 1908.
W. C. WILLIAMSON.
SHOCK ABSORBER FOR VEHICLES.
APPLICATION FILED MAY 10, 1907.
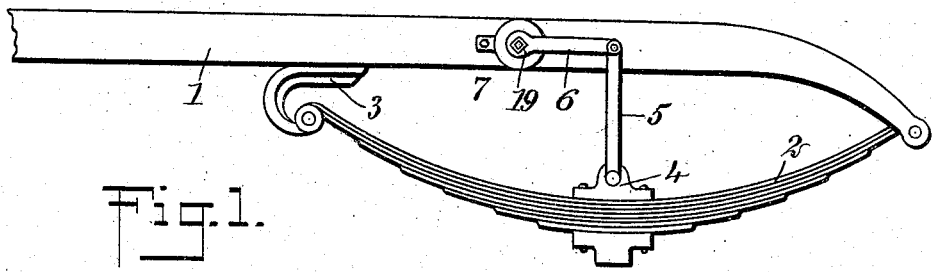
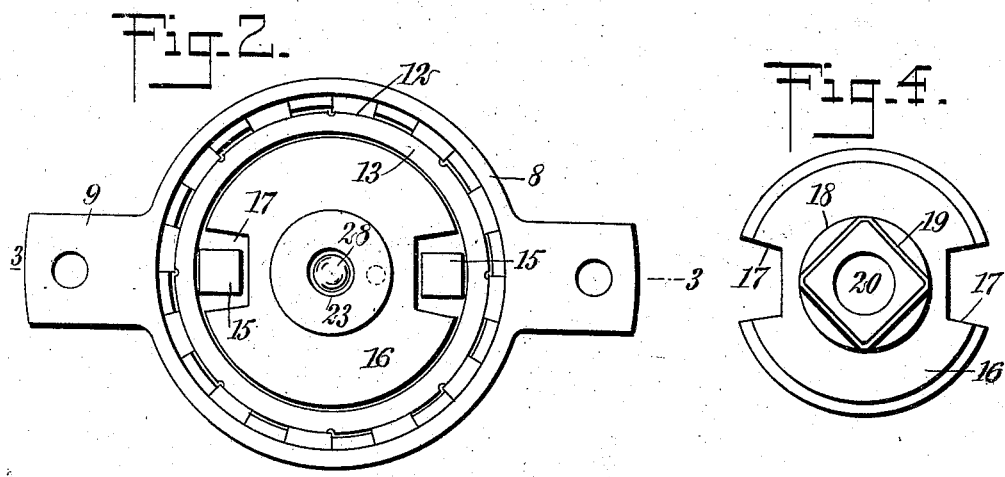
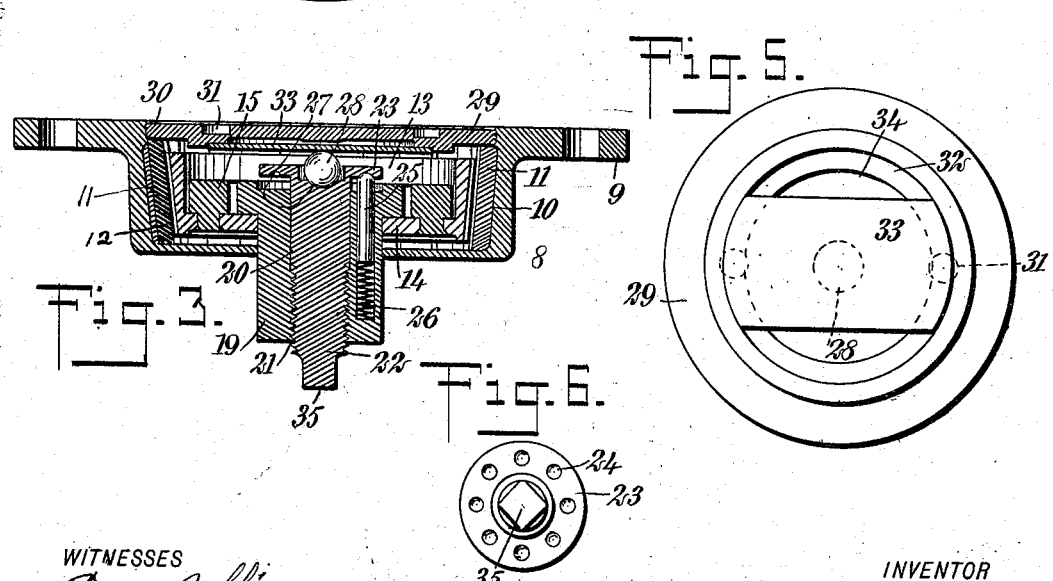
WITNESSES
INVENTOR
William C. Williamson
BY
ATTORNEYS

UNITED STATES PATENT OFFICE.

WILLIAM CHARLES WILLIAMSON, OF NEW YORK, N. Y.

SHOCK-ABSORBER FOR VEHICLES.

No. 884,967.  Specification of Letters Patent.  Patented April 14, 1908.

Application filed May 10, 1907. Serial No. 372,890.

*To all whom it may concern:*

Be it known that I, WILLIAM CHARLES WILLIAMSON, a citizen of the United States, and a resident of the city of New York, borough of Manhattan, in the county and State of New York, have invented a new and Improved Shock-Absorber for Vehicles, of which the following is a full, clear, and exact description.

This invention relates to shock absorbers such as used on the bodies of vehicles, and especially automobiles.

The object of the invention is to produce a device of this class which is simple in construction and which can be very accurately adjusted so as to give any resistance or absorption of shock desired.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the forward portion of an automobile frame showing the manner in which the device is applied in practice; Fig. 2 is an inside or rear elevation of the body of the device, with the inner plate removed; Fig. 3 is a cross section taken on the line 3—3 of Fig. 2; Fig. 4 is an elevation of the rocker removed from the other parts of the mechanism; Fig. 5 is an elevation showing the inner face of the removable back plate of the device; and Fig. 6 is a view showing the details of construction of an adjusting stud.

Referring more particularly to the parts, 1 represents the forward portion of the frame of an automobile or similar vehicle. The rear end of this frame extends downwardly, as shown, to provide means for attaching a spring 2. The rear end of this spring is attached to a goose neck bracket 3 fixed on the under side of the frame as shown.

My invention is applied in the usual manner by providing a clip 4 attached to the middle portion of the bow-spring 2. To the upper portion of this clip 4 a link 5 is pivotally attached, and this link connects pivotally with a rocker arm 6 which projects from the shock absorber 7, as indicated. The shock absorber is attached to the side of the frame.

It should be understood that with the up-and-down movement of the frame, the shock absorber offers a resistance to the movements of the arm 6, and in this way the shock due to the sudden movement of the automobile body, is absorbed.

The construction of the shock absorber will now be described; it comprises a body or case 8, of substantially cylindrical form, which is provided with laterally projecting ears 9 facilitating its attachment to the side of the frame. This body is provided with a slightly tapered conical bore 10 in which there is set a ring 11; and a plurality of rubbing pieces or strips 12 are set in the rubbing face of this ring as indicated clearly at the left of Fig. 3. Within this body there is received a barrel 13 which is of slightly conical form, fitting the interior of the body, as will be readily understood. The face of the barrel sets against the rubbing strips. This barrel consists simply of a rim having a disk 14 formed at the small end thereof. On the inner side of this disk, posts 15 or square studs are rigidly attached, and these project into the interior of the barrel.

On the interior of the barrel 13 I provide a rocker 16, which has a body of disk form having enlarged notches 17 formed in the edges thereof. These notches are adapted to receive the posts 15 which are placed diametrically opposite to each other, as shown in Fig. 2. The rocker is further provided with a round neck 18 which extends through openings formed in the disk 14 of the barrel, and through the case so as to present a square projecting head 19 on the outer side of the case. This rocker is provided with a longitudinal bore 20 which is provided with screw threads 21 so as to receive an adjusting stud 22 which passes into the interior of the case. Just beyond the inner face of the rocker 16, this stud 22 is formed with a thin projecting head 23, and on the under side of this head a plurality of circumferentially disposed recesses 24 are formed. In the neck 18 of the rocker a small pin 25 is set in a suitable opening, and behind this pin a helical spring 26 is placed which tends to force the pin outwardly so that its upper end is held in engagement with the under side of the head 23, and in one of the recesses 24, as shown in Fig. 3.

The inner end of the adjusting stud is cut away so as to form a seat 27 for a ball 28, and this ball projects above the head 23, as shown.

The barrel 13 is adapted to be set into the case from the rear through an enlarged opening which is closed by a plate 29 having a threaded edge 30 which enables it to be screwed in position. This plate is provided with recesses 31, enabling a spanner wrench to be used in placing it in position. On its inner face, the plate 29 is cut away so as to form an annular shoulder or seat 32 for a spring plate 33, and the central part of the face is removed so as to form a recess 34 so that when the plate is applied in position, the middle portion thereof is unsupported. When the plate is secured in position, the inner face of the spring plate 33 comes against the ball 28 as shown in Fig. 3.

The outer end of the adjusting stud 22 projects from the rocker and is formed with a reduced square head 35, the purpose of which will appear more fully hereinafter. Upon the square head 19 of the rocker, the rocker arm 6 is attached, as indicated in Fig. 1, so that as the frame moves up or down, the link 5 will rock the arm 6 and the rocker 16.

The mechanism within the shock absorber runs in a bath of oil.

The mode of operation, and the manner of adjusting the shock absorber, will now be described: As the rocker 16 moves in one direction or the other on its central axis, there is little or no resistance offered to its movement until the edges of the notches 17 come in contact with the sides of the posts 15. As soon as this occurs, a further movement of the rocker will also move the barrel 13. Considerable frictional resistance is offered to the rotation of the barrel, as will be readily understood, and this resistance absorbs the shock. It will be observed that the pressure between the barrel and the case is produced by the spring plate 33 pressing upon the ball 28.

If it is desired to adjust the parts so as to increase the pressure whereby the shock absorber will absorb a greater shock, this adjustment can be effected by applying a small wrench to the square head 35 of the adjusting stud. By screwing the stud in the proper direction, it can be advanced inwardly in the rocker, so as to press the ball 28 more firmly against the inner face of the spring plate 33. In adjusting up the stud in this manner, the amount of adjustment will be indicated by the pin 25 as it passes the recesses 24; thus the stud can be adjusted if desired, to the next recess or to the next beyond, and so on. The pin 25 also operates to hold the stud against accidental displacement from any position into which it has been adjusted.

Attention is called to the fact that the movements of the rocker do not have any material tendency to unscrew the back plate 29 of the device, for the reason that the only engagement made with the back plate is at the ball 28, which touches it at the center and practically in a single point; thus, there is no frictional turning movement exerted upon the plate so that it will stay in position when once screwed up. This insures that the adjustment will always remain as desired.

Having thus described my invention, I claim as new and desire to secure by Letters Patent:

1. In a shock-absorber, in combination, a case, a spring barrel, a spring plate, the edges whereof are supported in said case, and a member held against the body of said plate and transmitting the pressure thereof to said barrel.

2. In a shock absorber, in combination, a case, a friction barrel, means for exerting pressure on said barrel at a point on the axis thereof, and a rocker for moving said barrel.

3. In a shock absorber, in combination, a case, a friction barrel therein, a rocker adapted to move said barrel, a rotatable adjusting device on the axis of said barrel, and means for exerting pressure on said barrel at a point on the axis thereof.

4. In a shock absorber, in combination, a case, a friction barrel therein, an adjusting stud mounted coaxially with said barrel, means for exerting pressure on said barrel at a point on the axis thereof, and a rocker for moving said barrel.

5. In a shock absorber, in combination, a case, a barrel therein, an adjusting device rotatably mounted coaxially within said barrel and including a stud, means for permitting a step-by-step adjustment of said stud, and means for exerting pressure on said barrel at a point on the axis of said barrel.

6. In a shock absorber, in combination, a case, a barrel mounted therein, a spring plate attached in said case, an adjusting device rotatable coaxially with said barrel, and a member between said adjusting device and said plate and touching the same on the axis of said barrel.

7. In a shock absorber, in combination, a case, a barrel therein, a spring plate mounted in said case, a rocker, an adjusting stud mounted in said rocker coaxially with said barrel, and a ball held between said spring plate and said adjusting stud.

8. In a shock absorber, in combination, a case having a removable plate, a spring plate carried thereby on the inner side of said case, a barrel within said case, a rocker mounted coaxially in said barrel, an adjusting stud mounted coaxially in said rocker, and a ball held between said spring plate and said adjusting-stud.

9. In a shock absorber, in combination, a case, a barrel therein, a rocker mounted coaxially in said barrel, an adjusting stud mounted coaxially in said rocker and projecting therefrom, a spring plate in said case, a ball between said spring plate and said stud, and a spring-pressed pin set in said rocker, said stud having a head with recesses engaged by said pin to hold said stud against rotation.

10. In a shock absorber, in combination, a case, a friction barrel, a back plate, a spring plate seating on said back plate and pressing said barrel against said case, and means for adjusting the tension of said spring plate.

11. In a shock absorber, in combination, a case, a spring plate mounted therein and unsupported near its middle, a friction barrel in said case, and a member mounted on the middle of said spring plate and exerting pressure on said barrel.

In testimony whereof I have signed my name to this specification in the presence of two subscribing witnesses.

WILLIAM CHARLES WILLIAMSON.

Witnesses:
 I. A. RUTHERFORD,
 A. W. MEAD.